E. F. W. ALEXANDERSON.
ROTOR FOR DYNAMO ELECTRIC MACHINES.
APPLICATION FILED JULY 28, 1916.
1,261,673.
Patented Apr. 2, 1918.
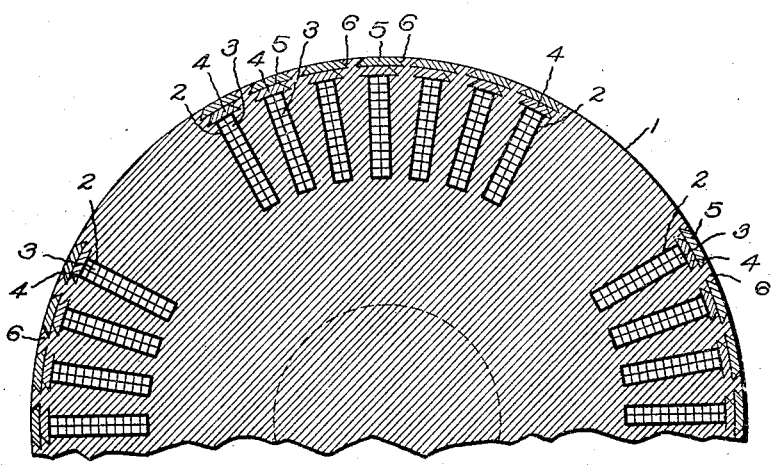
Inventor:
Ernst F. W. Alexanderson,
by
His Attorney

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ROTOR FOR DYNAMO-ELECTRIC MACHINES.

1,261,673.   Specification of Letters Patent.   Patented Apr. 2, 1918.

Application filed July 28, 1916. Serial No. 111,947.

*To all whom it may concern:*

Be it known that I, ERNST F. W. ALEXANDERSON, a citizen of the United States, residing at Schenectady, county of Schenectady, State of New York, have invented certain new and useful Improvements in Rotors for Dynamo-Electric Machines, of which the following is a specification.

My present invention relates to improvements in dynamo electric machinery and more particularly to alternating current generators adapted to be driven at high speeds.

In order to prevent undue heating of the field in a single phase turbo alternator having a distributed field winding on the rotor, it is customary to employ a heavy short-circuited squirrel cage winding on the rotor in addition to the field winding. In modern practice it has been found advantageous to use a solid steel rotor and in this case the need of such a winding is greater than in the case of a built up rotor. There is difficulty, however, in finding a suitable location for this winding, which must be of considerable cross-section in order to carry the heavy currents induced in it without too much heating, because of the fact that most of the available space is taken up by the field winding.

It has been proposed to utilize as bars for the squirrel cage winding the usual wedges which are employed for holding the field coils in place. The current flowing in the squirrel cage winding has a frequency double that of the armature current and with this double frequency the skin effect becomes so great that only a portion of the cross-section of the narrow thick wedges which must be used is effective in carrying the current.

The object of my invention is to overcome the disadvantage of previous constructions of rotors of the type in question and provide a squirrel cage winding of large effective cross section without sacrificing any of the space which would ordinarily be allotted to the field winding. In carrying my invention into effect I employ the usual wedges for holding the field coils in place and outside of these wedges place the squirrel cage bars in slots which are much wider than the slots provided for the field coils. These squirrel cage bars may be wedge shaped so as to be conveniently retained in place and may be wide enough to cover the greater part of the face of the rotor, only enough steel being left between the slots to resist the centrifugal force tending to displace the bars. They may also be made thin enough so that their entire cross section will be effective in carrying the current.

My invention will best be understood by reference to the following description taken in connection with the accompanying drawing in which I have shown a cross section of a portion of a rotor constructed in accordance with my invention.

As indicated in the drawing, the steel rotor 1 is provided with the usual radial slots 2 in which the field coils 3 are placed. These coils are held in place by the usual wedges 4 which may be of steel or other desired material. Outside of these wedges I place the squirrel cage bars 5 of copper or other low resistance metal, which may be much wider than the wedges 4 and also wedge shaped so as to be retained in the slots formed by the teeth 6. These bars are preferably of materially greater width than thickness as such a construction is most effective in utilizing the cross section of the metal to the best advantage. It will be apparent that all of the strain of the field coils is taken by the wedges 4 so that the only forces tending to displace the bars 5 are those acting upon the bars themselves. Hence the thickness of the teeth 6 at the bottom of the slots needs to be only great enough to resist the forces acting upon the bars 5.

The air gap of machines of the type under consideration is usually very large so that the diameter of the rotor can easily be increased to accommodate the squirrel cage winding, leaving the usual space available for the field winding. In case radial ducts are employed for purposes of ventilation, which might be obstructed by the squirrel cage bars placed in this way, openings may be made for the ducts by narrowing the squirrel cage bars at the points where the ducts are located. The ends of the bars may be connected together by means of any desired form of end ring construction.

What I claim as new and desire to secure by Letters Patent of the United States, is,—

1. The combination in a rotary member for a dynamo electric machine of a slotted field core, conductors in the slots of said core, wedges in said slots for retaining said conductors in place and bars of low resistance metal outside of said retaining wedges, said bars being of materially greater width than said wedges.

2. The combination in a rotary member for a dynamo electric machine of a slotted field core, conductors in the slots of said core, wedges in said slots for retaining said conductors in place, and bars of low resistance metal outside of said retaining wedges, said bars being adapted to form a part of a short circuited winding and being materially wider than the slots of said core.

3. The combination in a rotary member for a dynamo electric machine of a field core, a plurality of slots in said core, conductors in said slots, wedges in said slots for retaining said conductors in place, a second set of slots outside of and of greater width than the first named slots, and bars of low resistance material located in said second set of slots.

4. The combination in a rotary member for a dynamo electric machine of a field core, a plurality of slots in said core, conductors in said slots, wedges in said slots for retaining said conductors in place, a second set of slots outside of and of greater width than the first set of slots and wedge shaped bars of low resistance material located in said second set of slots, said bars being adapted to form a part of a short-circuited secondary winding.

5. The combination in a rotary member for a dynamo electric machine of a field core, a plurality of slots in said core, conductors in said slots, wedges in said slots for retaining said conductors in place, a second set of slots outside of the first set of slots and bars of low resistance material located in said second set of slots, said bars being of materially greater width than thickness.

In witness whereof, I have hereunto set my hand this 27th day of July, 1916.

ERNST F. W. ALEXANDERSON.

Copies of this patent may be obtained for five cents each, by addressing the "Commissioner of Patents. Washington, D. C."